(12) United States Patent
Noll et al.

(10) Patent No.: US 10,768,999 B2
(45) Date of Patent: Sep. 8, 2020

(54) INTELLIGENT LOAD SHEDDING FOR MULTI-CHANNEL PROCESSING SYSTEMS

(71) Applicant: Hamilton Sundstrand Corporation, Charlotte, NC (US)

(72) Inventors: Christopher Brian Noll, Glastonbury, CT (US); Steven A. Avritch, Bristol, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 120 days.

(21) Appl. No.: 16/031,179

(22) Filed: Jul. 10, 2018

(65) Prior Publication Data

US 2020/0019446 A1  Jan. 16, 2020

(51) Int. Cl.
*G06F 9/50* (2006.01)
*G06F 9/48* (2006.01)
*G06F 1/20* (2006.01)

(52) U.S. Cl.
CPC .............. *G06F 9/5094* (2013.01); *G06F 1/20* (2013.01); *G06F 1/206* (2013.01); *G06F 9/48* (2013.01); *G06F 9/4881* (2013.01); *G06F 9/4893* (2013.01); *G06F 9/50* (2013.01); *G06F 9/5005* (2013.01); *G06F 9/5022* (2013.01); *G06F 9/5027* (2013.01); *G06F 9/5083* (2013.01)

(58) Field of Classification Search
CPC ........ G06F 9/50; G06F 9/5005; G06F 9/5022; G06F 9/5027; G06F 9/5083; G06F 9/5094; G06F 9/48; G06F 9/4881; G06F 9/4893; G06F 1/20; G06F 1/206
See application file for complete search history.

(56) References Cited

U.S. PATENT DOCUMENTS

| | | | |
|---|---|---|---|
| 7,451,336 B2 | 11/2008 | Manuell et al. | |
| 7,707,443 B2* | 4/2010 | Chheda | G06F 1/3203 |
| | | | 361/679.46 |
| 7,814,343 B2* | 10/2010 | Kanno | G06F 1/3203 |
| | | | 713/300 |
| 2002/0101715 A1 | 8/2002 | Osecky et al. | |
| 2006/0200278 A1 | 9/2006 | Feintuch | |
| 2007/0101193 A1* | 5/2007 | Johnson | G06F 11/2736 |
| | | | 714/25 |
| 2011/0022871 A1* | 1/2011 | Bouvier | G06F 1/3206 |
| | | | 713/340 |
| 2016/0283314 A1* | 9/2016 | Thanner | G06F 11/0793 |
| 2018/0349235 A1* | 12/2018 | Freydel | G06F 11/187 |

OTHER PUBLICATIONS

Extended European Search Report for Application No. 19185317.5-1221 dated Nov. 18, 2019, 11 pages.

* cited by examiner

*Primary Examiner* — Charles M Swift
(74) *Attorney, Agent, or Firm* — Cantor Colburn LLP (57) ABSTRACT

Embodiments in include a system, a method, and a computer program product for performing intelligent load shedding for multi-channel processing system. The embodiments include a multi-channel processing system, wherein each channel of the multi-channel processing system includes a plurality of processors, and a plurality of links coupling each channel with each other channel in the multi-channel processing system, wherein the links are used to transmit status information of the plurality of processors. The embodiments also include a plurality of cooling elements coupled to each channel having the plurality of processors, wherein the plurality of cooling elements are configured to remove heat from the multi-channel processing system.

15 Claims, 5 Drawing Sheets

INTELLIGENT LOAD SHEDDING FOR MULTI-CHANNEL PROCESSING SYSTEMS

BACKGROUND

The present disclosure relates generally to processing systems, and more specifically to intelligent load shedding for multi-channel processing systems, such as those used on aircrafts and other vehicles.

Heat dissipation can be achieved by a variety of mechanisms such as passive and active heat management techniques. External active cooling commonly uses fans to move air across a chassis or more complex external cooling systems (ECS) to force cooling air into the system. High power applications can generate excess heat that must be addressed to ensure the reliability of the systems. In order to implement redundancy for critical applications require additional heat generating devices/equipment such as processors may be required and where additional heat management must be implemented in order to avoid failures. There is a need to intelligently disable one or more dissimilar processor from each channel to maximize the system's tolerance to common mode processing failures.

BRIEF DESCRIPTION

According to one embodiment, a system for performing intelligent load shedding for multi-channel processing system, the system comprising is provided. The system is a multi-channel processing system, wherein each channel of the multi-channel processing system includes a plurality of processors, a plurality of links coupling each channel with each other channel in the multi-channel processing system, wherein the links are used to transmit status information of the plurality of processors, and a plurality of cooling elements coupled to each channel having the plurality of processors, wherein the plurality of cooling elements are configured to remove heat from the multi-channel processing system.

In addition to one or more of the features described above, or as an alternative, further embodiments may include a plurality of cooling elements that includes cooling fans.

In addition to one or more of the features described above, or as an alternative, further embodiments may include status information that includes at least one of active/inactive information of each processor and processor temperature data.

In addition to one or more of the features described above, or as an alternative, further embodiments may include a processor of the plurality of processors of each channel that includes different types of processors.

In addition to one or more of the features described above, or as an alternative, further embodiments may include the plurality of processors for each channel that includes the same type of processors as each other channel.

In addition to one or more of the features described above, or as an alternative, further embodiments may include being responsive to a failed cooling element of the plurality of cooling elements, disabling a processor of the plurality of processors for the channel based at least in part on an active processor of the plurality of processors in the other channels.

In addition to one or more of the features described above, or as an alternative, further embodiments may include a cooling element of the plurality of cooling elements that is configured to indicate a status based on a reduced operation, wherein the reduced operation is based at least in part on a threshold.

In addition to one or more of the features described above, or as an alternative, further embodiments may include a cooling element that is associated with each processor respectively or wherein a cooling element is associated with a group of processors.

In addition to one or more of the features described above, or as an alternative, further embodiments may include a multi-channel processing system that includes at least a first channel, a second channel, and a third channel, wherein each channel includes three different processor types.

According to another embodiment, a method for intelligently load shedding for a multi-channel processing system is shown. The method includes detecting a failure of one or more cooling elements for a channel of a multi-channel processing system, wherein each channel includes a plurality of processors, responsive to the detected failure of the one or more cooling elements, obtaining status information of the plurality of processors, and selectively disabling a processor of the plurality of processors based at least in part on the detected failure of the one or more cooling elements and the obtained status information for the plurality of processors.

In addition to one or more of the features described above, or as an alternative, further embodiments may include detecting a failure of a subsequent cooling element, determining a type of processor associated with the subsequently failed cooling element, and disabling one or more processor of a dissimilar type that the subsequently failed cooling element to prevent a common mode failure.

In addition to one or more of the features described above, or as an alternative, further embodiments may include a plurality of cooling elements that includes cooling fans.

In addition to one or more of the features described above, or as an alternative, further embodiments may include status information that includes at least one of active/inactive information of each processor and processor temperature data.

In addition to one or more of the features described above, or as an alternative, further embodiments may include processors of the plurality of processors of each channel that include different types of processors.

In addition to one or more of the features described above, or as an alternative, further embodiments may include a plurality of processors for each channel that includes the same types of processors as each other channel.

In addition to one or more of the features described above, or as an alternative, further embodiments may include being responsive to a failed cooling element of the plurality of cooling elements, disabling a processor of the plurality of processors for the channel based at least in part on an active processor of the plurality of processors in the other channels.

In addition to one or more of the features described above, or as an alternative, further embodiments may include a cooling element of the plurality of cooling elements that is configured to indicate a status based on a reduced operation, wherein the reduced operation is based at least in part on a threshold.

In addition to one or more of the features described above, or as an alternative, further embodiments may include a cooling element that is associated with each processor respectively or wherein a cooling element is associated with a group of processors.

In addition to one or more of the features described above, or as an alternative, further embodiments may include the multi-channel processing system that includes at least a first channel, a second channel, and a third channel, wherein each channel includes three different processor types.

According to a different embodiment, a computer program product for intelligently load shedding for a multi-channel processing system is provided. The computer program product includes a computer-readable storage medium having stored thereon program instructions executable by a processor. The processor is configured to detect a failure of one or more cooling elements for a channel of a multi-channel processing system, wherein each channel includes a plurality of processors, responsive to the detected failure of the one or more cooling elements, obtain status information of the plurality of processors, and selectively disable (may want to also allow for reduced processor function vs. totally disabling) a processor of the plurality of processors based at least in part on the detected failure of the one or more cooling elements and the obtained status information for the plurality of processors. The processor is further configured to detect a failure of a subsequent cooling element, determine a type of processor associated with the subsequently failed cooling element, and disable one or more processor of a dissimilar type that the subsequently failed cooling element to prevent a common mode failure.

BRIEF DESCRIPTION OF THE DRAWINGS

The following descriptions should not be considered limiting in any way. With reference to the accompanying drawings, like elements are numbered alike.

DETAILED DESCRIPTION

In a multi-channel control system common mode failure of a processing system can necessitate dissimilar processors in each channel. With higher power multi-core processors, passive conduction cooling may not achieve the levels of cooling required for normal operation. In today's environment, different types of cooling mechanisms are available. This scenario can require external active cooling via a device such as a fan to help remove the hot air produced by the processing system. However, cooling fans offer limited reliability. In the event of cooling loss due to a failed cooling mechanism, a channel of the multi-channel processing system may need to shed one of its redundant processing lanes to operate within operational temperature ranges to prevent damage to the processing system.

In the event multiple cooling losses are experienced, the loads are not prioritized in each affected channel to maximize continued common mode failure coverage. Current techniques simply shed the same processor or a pre-determined processor as each channel's cooling losses occur often leading to the entire channel being disabled.

The techniques described herein provide a highly distributed multi-channel processing system that dynamically prioritizes the shedding of processor(s) in a dissimilar multi-processor processing system in a common mode tolerant manner. By maximizing the random dissimilarity among the processors redundancy against a particular processor type having a common defect is provided. Failure protection is increased by dynamically shedding different processor types in each channel. The techniques described herein provide protection for mission-critical applications such as flight control systems and engine control systems. In addition, the techniques described herein can provide for reducing the processor functionality upon the detection of failed cooling elements. The processors selected for reduced functionality are selected in the common mode tolerant manner similar to the techniques provided for load shedding. Other techniques can include both intelligently load shedding processors and reducing the functionality of processors in the same or separate embodiments.

Figure 1:
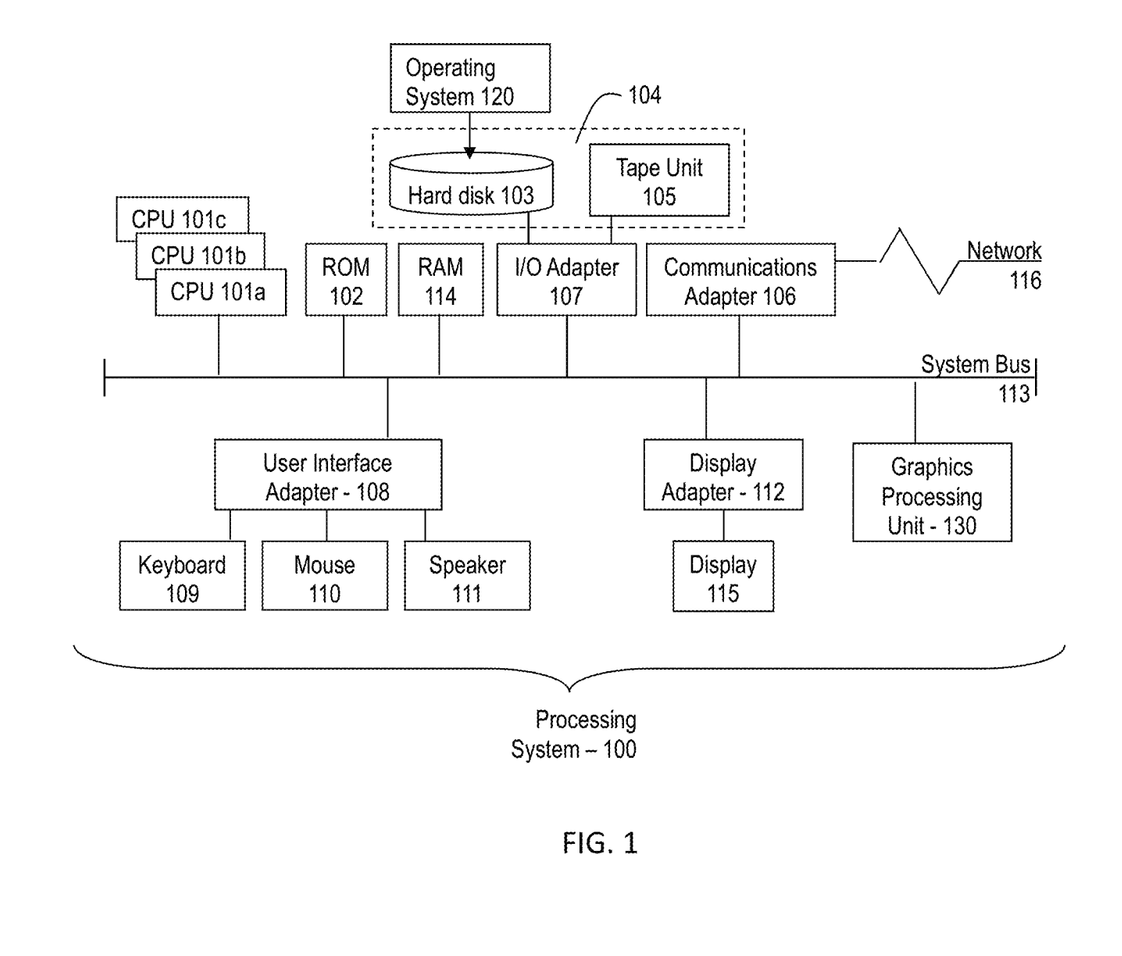
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
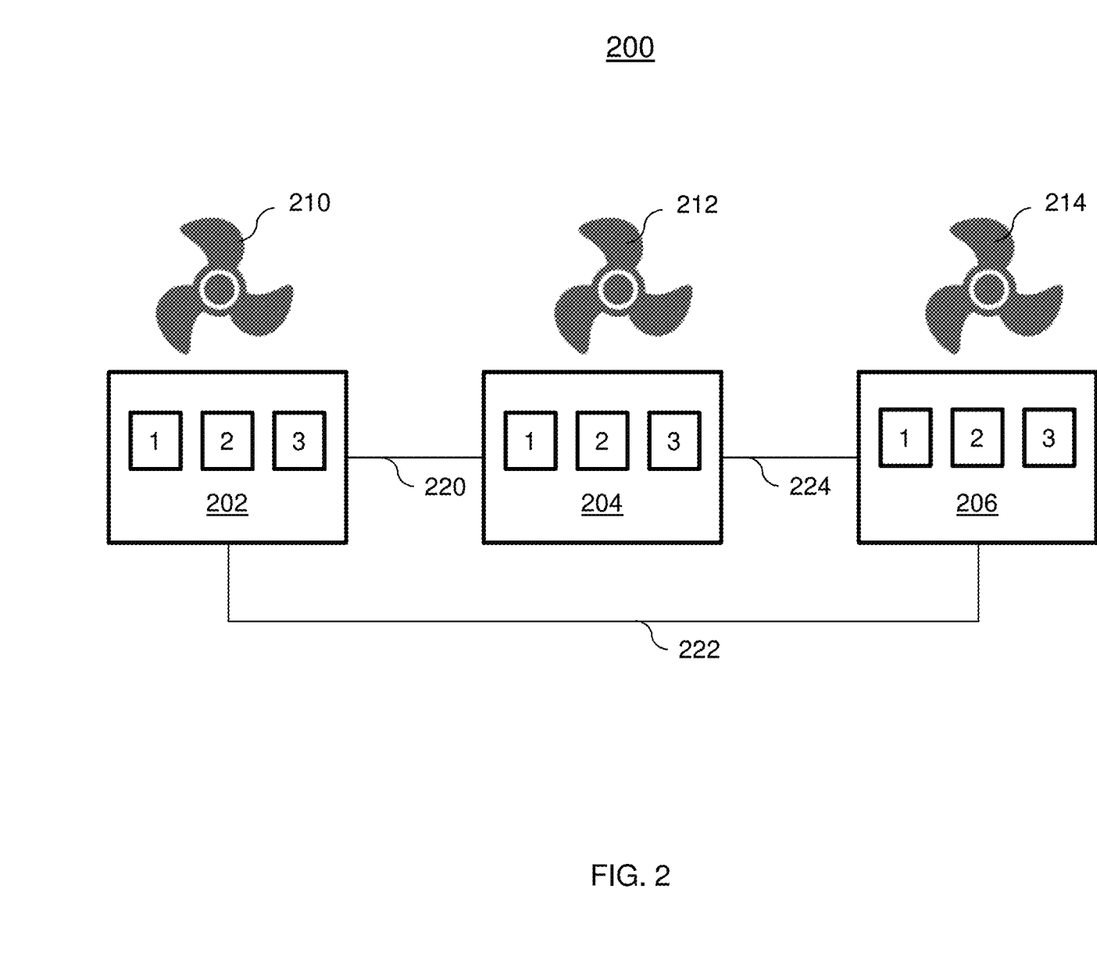
FIG. 2 depicts a system for implementing intelligent load shedding for a multi-channel processing system in accordance with one or more embodiments.

Now referring to FIG. 2, a processing system 200 to perform intelligent load shedding for the multi-processor/multi-channel processing system in accordance with one or more embodiments is shown. The processing system 200 can be implemented using one or more components of the system 100 shown in FIG. 1.

The processing system 200 is a multi-channel processing system having 3 channels 202, 204, and 206, where each channel is configured with a plurality of processors 1, 2, and 3, to implement a common mode failure tolerant architecture. Although only 3 channels having 3 processors each are shown, it should be understood that any number of channels and processor can be used in the processing system 200 to implement the common mode failure tolerant architecture described herein.

FIG. 2 also illustrates cooling elements 210, 212, and 214 that correspond to each channel 202, 204, and 206, respectively, to provide cooling and remove heat from the processing system 200. In addition, each channel 202, 204, and 206 is configured to communicate with each other channel over communication links to exchange status information. The first channel 202 is coupled to the second channel 204 over link 220. The first channel 202 is also coupled to the third channel 206 over link 222 and the second channel 204 is coupled to the third channel 206 over a link 224. The status information exchanged over the links can indicate information related to the active/inactive processor state. In addition, the status information can also include temperature information for each processor of each channel which can indicate a failing cooling element in the event the processor is operating at abnormally high temperatures when compared to its specification or historic operational temperatures. The status information is used to determine whether to implement a load shedding technique to disable a processor of a channel having a failed cooling element in a common mode fault-tolerant manner.

In one or more embodiments, in addition to intelligently shedding the processors for each channel, the processor functionality can be reduced based on the detected failed cooling element. In addition, the amount by which the functionality of each processor is reduced can be a function of the temperature of the processor/system. For example, the higher the detected temperature the greater the functionality of the selected processor is reduced. In addition, the processor that is selected to operate in a reduced functionality mode is selected according to the common mode fault-tolerant methods that are described herein.

Figure 3:
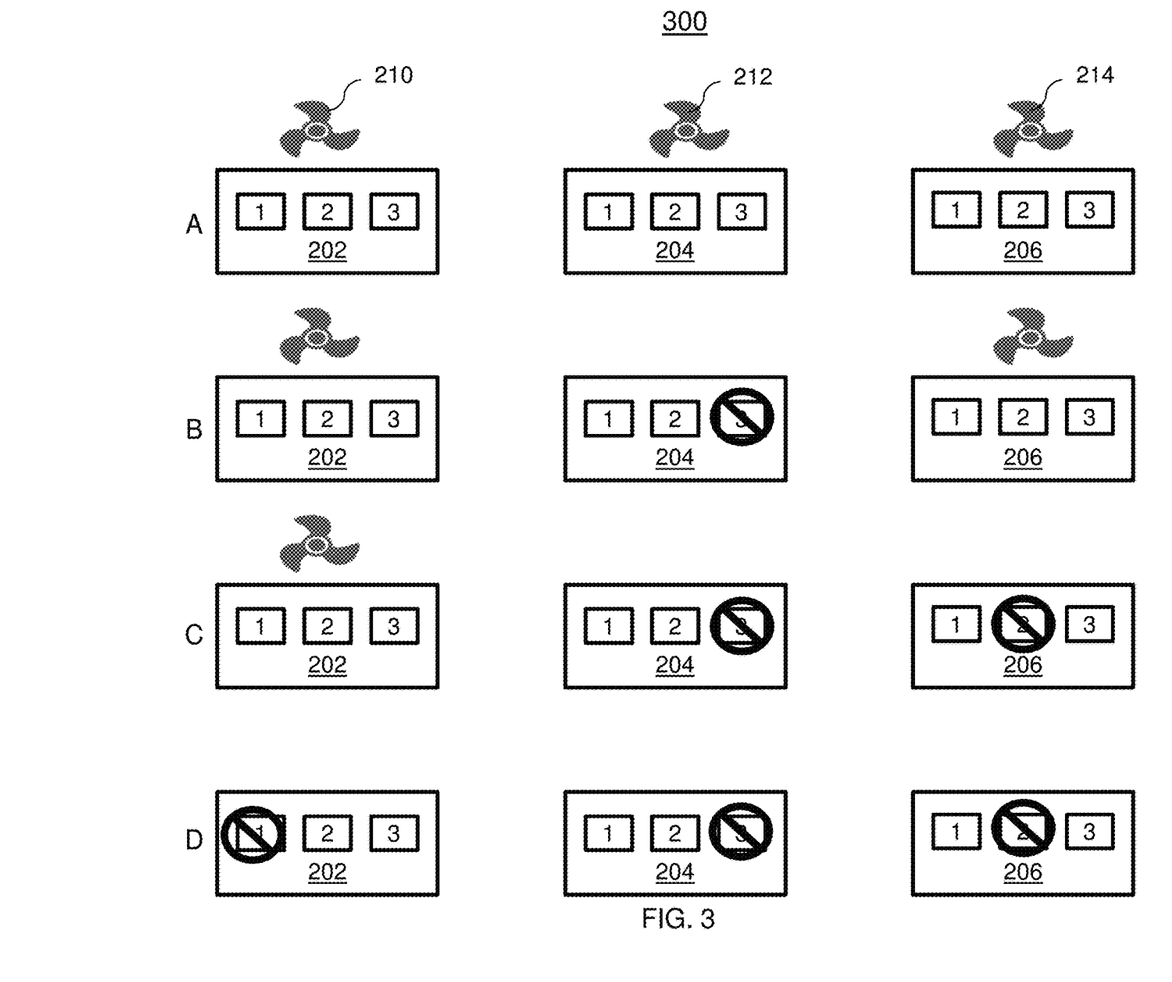
FIG. 3 depicts another perspective of a system in accordance with one or more embodiments.

Now referring to FIG. 3, a processing system 300 for intelligent load shedding for the multi-channel processing system in accordance with one or more embodiments is shown. FIG. 3 depicts various scenarios that are described with reference to the common mode protection scheme described herein.

Scenario A depicts a first channel, second channel, and third channel, such as channels 202, 204, and 206, respectively, of the multi-channel processing system 200 shown in FIG. 2, where each channel includes a plurality of processors (1, 2, 3). Scenario A also illustrates each of the cooling elements (210, 212, 214) that correspond to each channel is functioning properly so there is no need to implement a load shedding method to disable one or more of the processors in each channel to reduce the heat generated in the multi-channel processing system.

Scenario B indicates the cooling element 212 for channel 2 has been rendered inoperable or has failed. Therefore, one of the processors (1, 2, 3) associated with channel 2 will need to be load shed to ensure the channel does not fail due to the excess generated heat. Processor 3 of channel 2 has been selected and the status of the processor 3 for channel 2 has been updated and transmitted to the other channels. The status information can indicate the active/inactive status of the processor. In addition, the status can include the temperature information of the processor which can also indicate a failing or failed cooling element in the event the processor temperature exceeds the normal operating temperatures for that particular processor. The previous operating temperatures can be recorded and compared to the current operating temperature to determine whether the temperatures of the processors are abnormal.

Now with reference to scenario C, another channel's cooling element has failed in addition to that shown in scenario B. The channels (2 and 3) have indicated cooling element failures where the processor that is shed is selected according to the common mode tolerant scheme described herein. Because processor 3 of the channel 2 was previously shed, the processor 3 of channel 3 will not be disabled because they are the same type of processor. As shown in this example, processor 2 of channel 3 is taken offline so that there is redundancy in each type of processor that is operating in the multi-channel processing system of FIG. 3. However, processor 1 of channel 3 could have been taken down based on the operating processors of channel 2. In one or more embodiments, additional status information to the active/inactive state such as the normal operating temperature could have been used to select the processor to disable in channel 3. Responsive to selecting the processor to disable, an update is sent to the other processors of the other channels to communicate the current status of the processors.

In scenario D, yet another channel is shown to have lost the operability of its cooling element where the loss of cooling elements on each of the 3 channels is shown. At least one channel in this scenario will remain common mode tolerant. However, in conventional schemes that shed the same processor in each channel upon the detection of a failed cooling element, the common mode tolerant channels will not be realized. The active processors (2, 3) of channel 1 have redundancy with processor 2 of channel 2 and processor 3 of channel 3. The active processors (1, 2) of channel 2 have redundancy with processor 1 of channel 3 and processor 2 of channel 1. Finally, the active processors (1, 3) of channel 3 have redundancy with processor 1 of channel 2 and processor 3 of channel 1.

Figure 4:
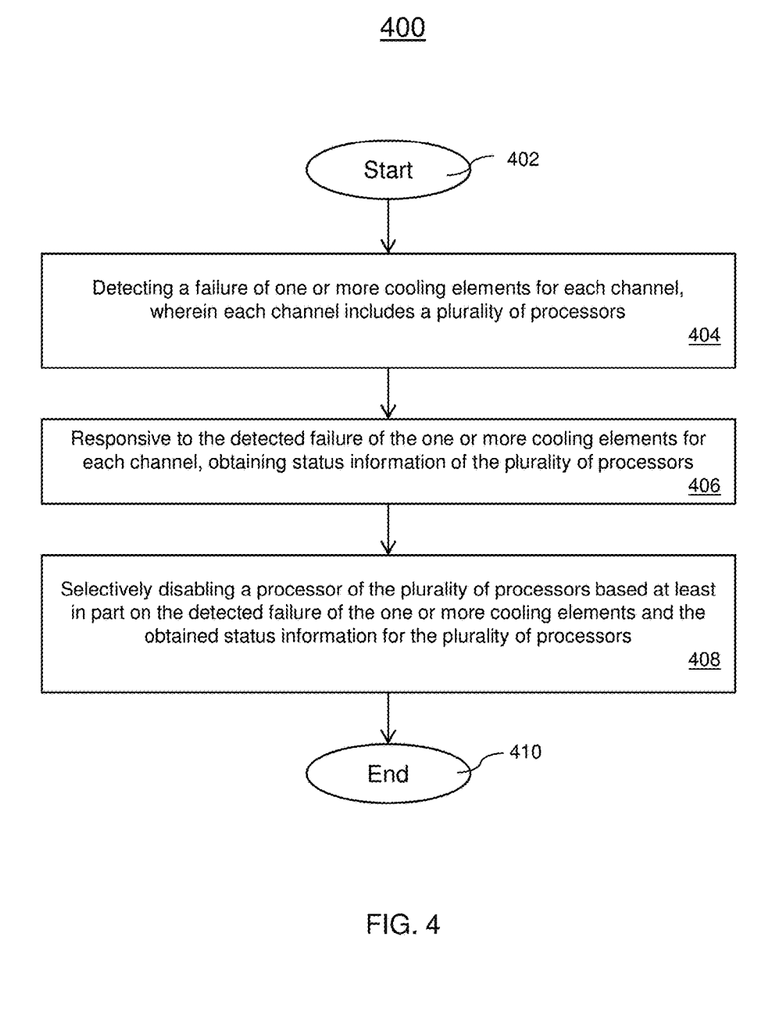
FIG. 4 depicts a flowchart for intelligent load shedding for a multi-channel processing system in accordance with one or more embodiments.

Now referring to FIG. 4, a flowchart of a method 400 for intelligent load shedding for a multi-channel processing system is shown.

The method 400 can be implemented in any of the systems shown in FIG. 1-3. The method 400 begins at block 402 and continues block 404 which provides for detecting a failure of one or more cooling elements for each channel of a multi-channel processing system, wherein each channel includes a plurality of processors. The method 400 proceeds to block 406 and includes responsive to the detected failure of the one or more cooling elements for each channel, obtaining status information for a plurality of processors of each channel. At block 408, the method 400 provides for selectively disabling a processor of the plurality of processors based at least in part on the detected failure of the one or more cooling elements and the obtained status information for the plurality of processors. In one or more embodiments, a selected processor operates with a reduced functionality instead of being completely disabled. The method 400 ends at block 410.

Figure 5:
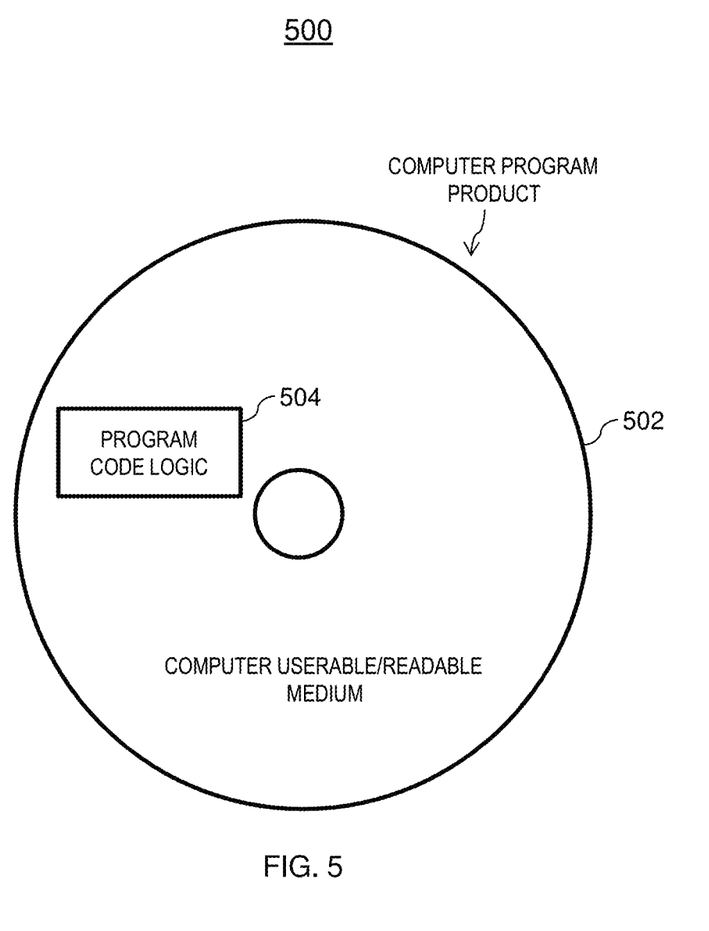
FIG. 5 depicts a computer-program product in accordance with one or more embodiments of the invention.

Referring now to FIG. 5, a computer program product 500 in accordance with an embodiment that includes a computer-readable storage medium 502 and program instructions 504 is generally shown.

The technical effects and benefits include increased reliability of operations against common mode failures in mission-critical processes. Common mode failures occur when two or more structures, systems or components in the same manner or mode due to a single event or cause. The common mode failure detection is maximized by maintaining the largest combination of dissimilar architectures across channels during operation.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for performing intelligent load shedding for a multi-channel processing system, the system comprising:
   a multi-channel processing system, wherein each channel of the multi-channel processing system includes a plurality of processors, wherein each processor of the plurality of processors of each channel includes different types of processors;
   a plurality of links coupling each channel with each other channel in the multi-channel processing system, wherein the links are used to transmit status information of the plurality of processors; and
   a plurality of cooling elements coupled to each channel having the plurality of processors, wherein the plurality of cooling elements are configured to remove heat from the multi-channel processing system,
   wherein the multi-channel processing system is configured to: selectively disable a processor of the plurality of processors based at least in part on the detected failure of the one or more cooling elements and the obtained status information for the plurality of processors;
   detecting a failure of a subsequent cooling element;
   determining a type of processor associated with the subsequently failed cooling element; and
   disabling one or more processors of a dissimilar type than the subsequently failed cooling element to prevent a common mode failure and maintaining other dissimilar processors of the one or more processors in operation in a commode mode.

2. The system of claim 1, wherein the plurality of cooling elements includes cooling fans.

3. The system of claim 1, wherein the status information includes at least one of active/inactive information of each processor and processor temperature data.

4. The system of claim 1, responsive to a failed cooling element of the plurality of cooling elements, disabling a processor of the plurality of processors for the channel based at least in part on an active processor of the plurality of processors in the other channels.

5. The system of claim 1, wherein a cooling element of the plurality of cooling elements is configured to indicate a status based on a reduced operation, wherein the reduced operation is based at least in part on a threshold.

6. The system of claim 1, wherein a cooling element is associated with each processor respectively or wherein a cooling element is associated with a group of processors.

7. The system of claim 1, wherein the multi-channel processing system includes at least a first channel, a second channel, and a third channel, wherein each channel includes three different processor types.

8. A method for intelligently load shedding for a multi-channel processing system, the method comprising:
   detecting a failure of one or more cooling elements for a channel of a multi-channel processing system, wherein each channel includes a plurality of processors;
   responsive to the detected failure of the one or more cooling elements, obtaining status information of the plurality of processors;
   selectively disabling a processor of the plurality of processors based at least in part on the detected failure of the one or more cooling elements and the obtained status information for the plurality of processors,
   detecting a failure of a subsequent cooling element;
   determining a type of processor associated with the subsequently failed cooling element; and
   disabling one or more processors of a dissimilar type than the subsequently failed cooling element to prevent a common mode failure and maintaining other dissimilar processors of the one or more processors in operation in a commode mode.

9. The method of claim 8, wherein the plurality of cooling elements includes cooling fans.

10. The method of claim 8, wherein the status information includes at least one of active/inactive information of each processor and processor temperature data.

11. The method of claim 8, responsive to a failed cooling element of the plurality of cooling elements, disabling a processor of the plurality of processors for the channel based at least in part on an active processor of the plurality of processors in the other channels.

12. The method of claim 8, wherein a cooling element of the plurality of cooling elements is configured to indicate a status based on a reduced operation, wherein the reduced operation is based at least in part on a threshold.

13. The method of claim 8, wherein a cooling element is associated with each processor respectively or wherein a cooling element is associated with a group of processors.

14. The method of claim 8, wherein the multi-channel processing system includes at least a first channel, a second channel, and a third channel, wherein each channel includes three different processor types.

15. A computer program product for intelligently load shedding for a multi-channel processing system, the computer program product comprising:
 a non-transitory computer readable storage medium having stored thereon program instructions executable by a processor to cause the processor to:
  detect a failure of one or more cooling elements for a channel of a multi-channel processing system, wherein each channel includes a plurality of processors;
  responsive to the detected failure of the one or more cooling elements, obtain status information of the plurality of processors;
  selectively disable a processor of the plurality of processors based at least in part on the detected failure of the one or more cooling elements and the obtained status information for the plurality of processors;
  detect a failure of a subsequent cooling element;
  determine a type of processor associated with the subsequently failed cooling element; and
  disable one or more processor of a dissimilar type that the subsequently failed cooling element to prevent a common mode failure and maintain other dissimilar processors of the one or more processors in operation in a commode mode.

* * * * *